United States Patent
Colombo

(10) Patent No.: US 12,480,989 B2
(45) Date of Patent: Nov. 25, 2025

(54) PROGRAMMABLE DELAY TESTING CIRCUIT

(71) Applicant: STMicroelectronics International N.V., Geneva (CH)

(72) Inventor: Filippo Colombo, Monza (IT)

(73) Assignee: STMicroelectronics International N.V., Geneva (CH)

( * ) Notice: Subject to any disclaimer, the term of this patent is extended or adjusted under 35 U.S.C. 154(b) by 208 days.

(21) Appl. No.: 18/344,629

(22) Filed: Jun. 29, 2023

(65) Prior Publication Data

US 2025/0004048 A1 Jan. 2, 2025

(51) Int. Cl.
*G01R 31/316* (2006.01)

(52) U.S. Cl.
CPC .................. *G01R 31/316* (2013.01)

(58) Field of Classification Search
None
See application file for complete search history.

(56) References Cited

U.S. PATENT DOCUMENTS

| | | |
|---|---|---|
| 6,587,811 B2 | 7/2003 | Schleifer et al. |
| 8,225,156 B1 | 7/2012 | Tabatabaei et al. |
| 8,531,196 B1 * | 9/2013 | Shelat .............. G01R 31/2831 324/762.05 |
| 2005/0264331 A1 | 12/2005 | Lin et al. |
| 2007/0024630 A1 | 2/2007 | Haugestuen |
| 2008/0222471 A1 * | 9/2008 | Sul ................. G01R 31/318594 714/731 |
| 2011/0074385 A1 | 3/2011 | Sunaga et al. |
| 2014/0375329 A1 | 12/2014 | Van De Graaff et al. |
| 2018/0031631 A1 | 2/2018 | Srinivasan et al. |

FOREIGN PATENT DOCUMENTS

| | | | |
|---|---|---|---|
| CN | 119224528 A * | 12/2024 | ......... G01R 31/2882 |
| WO | 2022128713 A1 | 6/2022 | |

OTHER PUBLICATIONS

Translation of CN-119224528-A (Year: 2024).*
European Extended Search Report, Application No. 24178376.0-1001, Nov. 7, 2024, 10 pages.

* cited by examiner

Primary Examiner — Jermele M Hollington
(74) Attorney, Agent, or Firm — Slater Matsil, LLP

(57) ABSTRACT

An integrated circuit includes a test circuit, and an analog delay circuit and a sampler register, each configured to receive a signal. The delay circuit includes a configuration input and phases with a final phase. The sampler register includes result outputs and delay inputs that are each coupled to a respective delay output of the phases. The sampler register is configured to output a sample signal indicating a relationship between the signal and at least the final phase of the phases. The integrated circuit further includes a test circuit that includes a configuration output coupled to the configuration input of the delay circuit, and result inputs coupled to the result outputs of the sampler register. The test circuit is configured to iterate through selected values to test the delay circuit and determine that the delay circuit passes the test when the relationship matches a predetermined criterion.

20 Claims, 8 Drawing Sheets

PROGRAMMABLE DELAY TESTING CIRCUIT

TECHNICAL FIELD

The present invention relates generally to testing of integrated circuits, and, in particular embodiments, to structures of test circuits for testing a programmable delay circuit, and methods of operation thereof.

BACKGROUND

Integrated circuits (ICs) require testing to verify proper operation. Increasingly, ICs are becoming more complex and contain a mixture of digital and analog logic that requires strict defectivity assessment during testing both in characterization and production. For example, many parts of the circuits, such as analog circuits of a system on chip (SoC), require specific test techniques and time-consuming setups. Moreover, many ICs are used in critical applications (e.g., automotive) and require very high quality and safety levels.

During testing, the ICs can be placed on a test bench and a test engineer can use an external test setup (e.g., automated test equipment (ATE)) to implement the specific test techniques. The testing process can include writing a test program to ramp up some input control and then measure some output (e.g., from a model). However, such an arrangement can be time consuming. For example, every time that the external test setup is relied upon there is a setup time for the test engineer as well as additional delays such as settling time of the instruments. Further, external test setups may introduce more variability to the testing process which can increase the possibility of errors during the testing procedure.

Therefore, faster methods of testing features of ICs, such as an analog block, while reducing the possibility of errors, reducing the complexity of the setup, without the need to write the test program, may be desirable.

SUMMARY

In accordance with an embodiment of the invention, an integrated circuit includes an analog delay circuit that includes a plurality of delay phases, a delay configuration input, and a signal input configured to receive a signal to be delayed. The plurality of delay phases includes an initial delay phase and a final delay phase. The integrated circuit also includes a sampler register including a signal input configured to receive the signal to be delayed, a plurality of test result outputs, and a plurality of delay inputs that are each coupled to a respective delay output of the plurality of delay phases. The sampler register is configured to output a sample signal indicating a relationship between the signal to be delayed and at least the final delay phase of the plurality of delay phases. The integrated circuit further includes a test circuit that includes a delay configuration output coupled to the delay configuration input of the analog delay circuit, and a plurality of test result inputs coupled to the plurality of test result outputs of the sampler register. The test circuit is configured to iterate through a plurality of selected delay values provided to the analog delay circuit at the delay configuration input to test the analog delay circuit, and determine that the analog delay circuit passes the test in response to receiving the sample signal at the plurality of test result inputs by determining that the relationship matches a predetermined criterion.

In accordance with another embodiment of the invention, a built-in self-test (BIST) circuit includes a sampler register that includes a signal input configured to receive a signal to be delayed, a plurality of test result outputs, and a plurality of delay inputs that are each configured to be coupled to a respective delay output of a plurality of delay phases of an analog delay circuit. The sampler register is configured to output a sample signal indicating a relationship between the signal to be delayed and at least a final delay phase of the plurality of delay phases. The BIST circuit also includes a finite state machine circuit including a delay configuration output configured to be coupled to a delay configuration input of the analog delay circuit, a plurality of test result inputs coupled to the plurality of test result outputs of the sampler register, and a test data register coupled to the finite state machine circuit. The finite state machine circuit is configured to iterate through a plurality of selected delay values provided to the analog delay circuit at the delay configuration input to test the analog delay circuit, determine that the analog delay circuit passes the test by determining that the relationship matches a predetermined criterion in response to receiving the sample signal at the plurality of test result inputs, and output delay tuning data indicating a selected delay value of the plurality of selected delay values, the selected delay value being associated with matching the predetermined criterion. The test data register is configured to store status flags of the finite state machine circuit and the delay tuning data.

In accordance with still another embodiment of the invention, a method of testing an analog delay circuit of an integrated circuit includes receiving a signal to be delayed at a signal input of the analog delay circuit and receiving the signal to be delayed at a signal input of a sampler register of the integrated circuit. The analog delay circuit includes a delay configuration input and a plurality of delay phases including an initial delay phase and a final delay phase. The sampler register includes a plurality of test result outputs and a plurality of delay inputs that are each coupled to a respective output of the plurality of delay phases. The method further includes outputting from the sampler register a sample signal indicating a relationship between the signal to be delayed and at least the final delay phase of the plurality of delay phases, iterating through a plurality of selected delay values provided by a delay configuration output of a test circuit of the integrated circuit to the analog delay circuit at the delay configuration input to test the analog delay circuit, and determining that the analog delay circuit passes the test in response to receiving the sample signal at the plurality of test result inputs by determining that the relationship matches a predetermined criterion. The test circuit includes a plurality of test result inputs coupled to the plurality of test result outputs of the sampler register.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
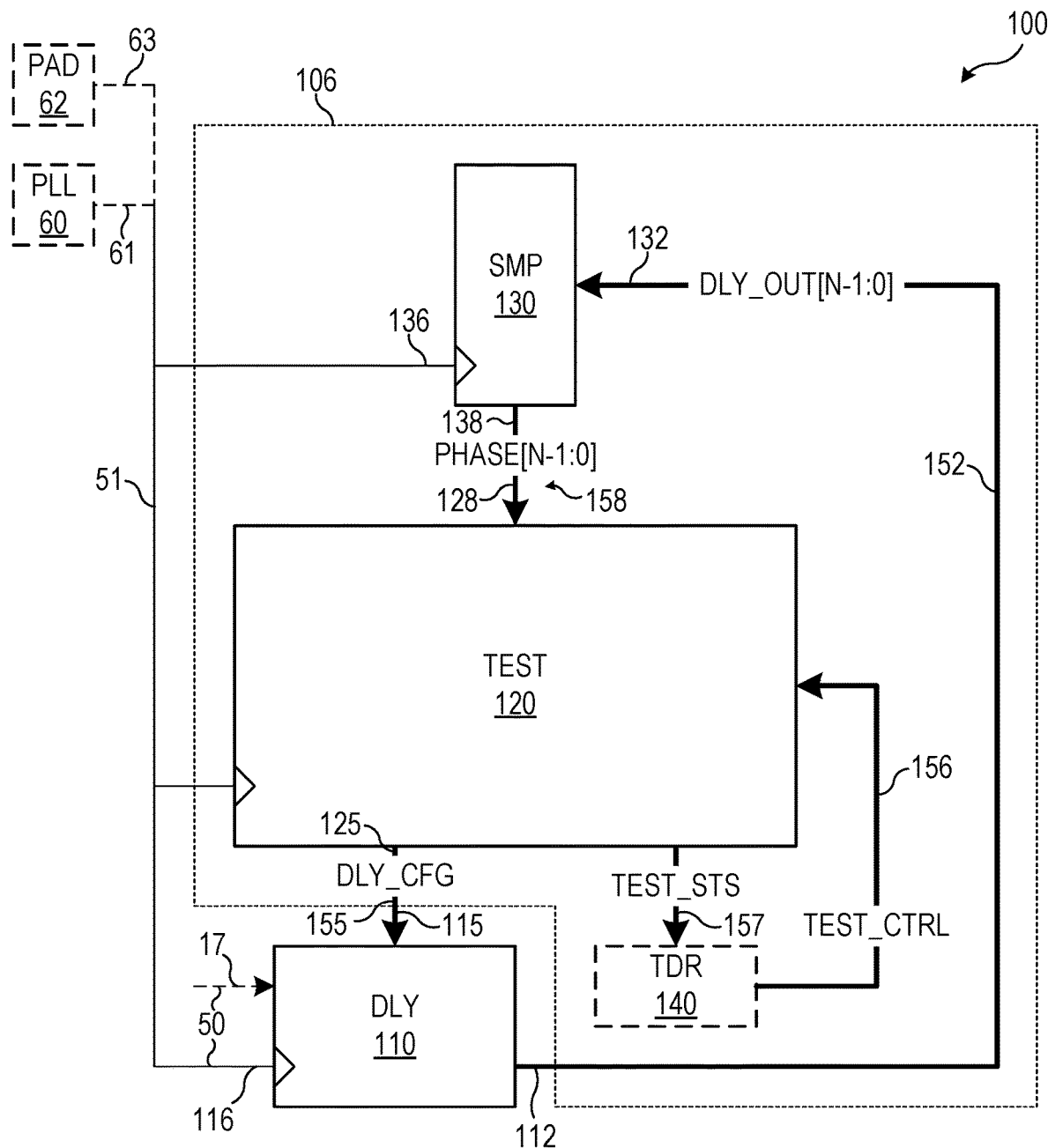
FIG. 1 illustrates an example integrated circuit that includes an analog delay circuit, a test circuit configured to test the analog delay circuit, and a sampler register configured to output a sample signal indicating the relationship between a signal to be delayed and at least the final delay phase of the analog delay circuit in accordance with embodiments of the invention.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope. Unless specified otherwise, the expressions "around", "approximately", and "substantially" signify within 10%, and preferably within 5% of the given value or, such as in the case of substantially zero, less than 10% and preferably less than 5% of a comparable quantity.

Nowadays integrated circuits (ICs), such as automotive ICs are growing in complexity require a high level of Quality (e.g., having o ppm undetected defectivity target) and Safety (e.g., meeting a certain automotive safety integrity level (ASIL)). This is leading to a significant increase of automated test equipment (ATE) testing cost in terms of test time (e.g., due to the high number of tests to be performed) and resources (e.g., because complex systems on a chip (SoCs) are often equipped with a high number of analog circuits whose functionality must be verified with ad-hoc design for testing (DFT) architectures).

The conventional approach to DFT of analog circuits, such as programmable analog delay circuits, is to rely on an ATE approach where each test step is configured by setting the circuit under test into test mode to access the configuration of the circuit by a test manager that is inside the device. However, the inputs are still ultimately provided from the SoC pins. Specifically, in the conventional ATE approach for measuring a programmable analog delay circuit, each step of the in-to-out delay produced by the delay circuit is configured through a joint test action group (JTAG) interface, such as by programming dedicated test data registers (TDRs). The values in the TDRs can be used to override the function/control of the circuit. The phase between input and output signal is measured by driving the input signal and observing the output delayed signal on dedicated test pads or by adopting some kind of timestamping/sampling of the signals.

The in-to-out delay measurement of the conventional ATE approach has the drawback of being time consuming and tedious (cyclical JTAG programming combined with measurement at each delay step results in longer test time). Conventional ATE also has the limitation of being incapable of observing high-frequency (e.g., greater than about 80-100 MHz) signals on test pads (e.g., because of parasitic capacitance). Additionally, propagation delays from the input pad to the circuit under test and from the circuit under test to the output pad must be evaluated to understand the impact on the phase shift measurement.

Another conventional approach to DFT of analog circuits, such as a programmable analog delay circuits, is a functional approach where the circuit under test is tested while working in functional mode. In the functional approach, the circuit under test must be configured by writing to functional registers and then tested using an application-like setup. However, due to the being tested in functional mode, the functional approach offers less control and flexibility. Further, functional configuration of the circuit under test is difficult in the testing environment.

Because of these drawbacks to conventional approaches, IC device testing is becoming a bottleneck to profitability. Consequently, attempts are being made to design DFT solutions that reduce the required test time and/or the required ATE resources. Built-in self-test (BIST) techniques may be useful to address these issues. The advantages of BIST solutions may be even more evident when the conventional ATE testing procedure for a particular circuit of an IC requires many measurements to be cyclically repeated with configuration changes before each new measurement. An example of this situation may be the testing of programmable analog delay circuits. Such circuits may be configured to produce a programmable delay between a programmable delay signal, such as an input (e.g., a clock, synchronization, protocol, etc.), and a related output signal until a certain phase shift condition is met.

The programmable delay of a programmable analog delay circuit may be generated by introducing a programmable amount of skew. Testing this can be time consuming because a configuration code must be generated to produce a given delay on the output signal. From a practical standpoint, these codes can be manually researched by a test programmer and written by a test engineer to sequentially configure the circuit in the desired way so that the output can be measured with respect to the input (e.g., to measure the delay). If the desired condition is not met (e.g., the specification condition), the testing may continue further. For example, another configuration code to produce another input to output delay may be determined, and so on until the desired delay between the input and output is met.

As mentioned above, a typical approach might be to write a configuration for JTAG, measure the shift in the phase between the input and output signal, and observe the delayed output on a dedicated test pad. This approach requires access pads for both the specific test purpose and the specific test mode. The pads must be connected to the circuit under test to be stimulated by test equipment (e.g., ATE)).

In view of the above deficiencies there is a desire to automate the testing process. Relying on internal logic for testing (e.g., including functional logic that can also be used for testing) may advantageously speed up test time and reduce the amount of resources required for testing. Some or all of the above disadvantages are overcome by a custom test architecture usable in testing any device (e.g., integrated circuit) that includes an analog circuit configured to produce a programmable in-to-out delay.

In various embodiments, an integrated circuit includes an analog delay circuit, a sampler register, and a test circuit (e.g., a BIST circuit including a finite state machine (FSM), for example). The analog delay circuit has a delay configuration input, a signal input configured to receive a signal to be delayed, and a plurality of delay phases including at least an initial delay phase and a final delay phase. For example, the signal to be delayed may be delayed by the plurality of delay phases and the extent of the delay may be configured using the delay configuration input. The delay phases may be cascaded so that a portion of the total delay may be caused by each of the delay phases.

The sampler register has a signal input that is also configured to receive the signal to be delayed, a result output and a plurality of delay inputs that are each coupled to a respective output of the plurality of delay phases. The sampler register is configured to output an indication of a relationship between the signal to be delayed and at least the final delay phase of the plurality of delay phases.

The test circuit has a delay configuration output coupled to the delay configuration input of the delay circuit, and a test result input coupled to the result output of the sampler register. The test circuit is configured to determine whether the delay circuit passes the testing criteria. For example, the test circuit may be configured to iterate through a plurality of selected delay values provided to the delay circuit at the delay configuration input to test the delay circuit. The test circuit may then determine that the analog delay circuit passes the test in response to receiving the indication at the test result input by determining that the relationship matches a predetermined criterion. For instance, the predetermined criterion may be a delay threshold, such as if the signal and at least the final delay phase indicate that a delay that is at least one period (e.g., clock cycle).

The embodiment integrated circuits including an analog delay circuit, a sampler register, and a test circuit described herein may advantageously reduce or eliminate the undesirable attributes of conventional methods of testing analog circuit in integrated circuits. For example, the embodiment integrated circuits may advantageously enable easier and faster testing of circuits (e.g., chips, ICs, SoCs, etc.). The embodiments may provide the benefit of reducing or eliminating the need for configuration by a test engineer during testing. A further advantage of the embodiments may be to reduce the possibility of errors during the testing process. The embodiment integrated circuits may also advantageously save test time while in production (e.g., by providing a useful pass/fail test result, as opposed to results requiring further analysis, for example).

Embodiments provided below describe various integrated circuits, and in particular, integrated circuits that include an analog delay circuit, a test circuit configured to test the analog delay circuit, and a sampler register configured to output a sample signal to the test circuit. The following description describes the embodiments. FIG. 1 is used to describe an example integrated circuit. Another example integrated circuit is described using FIG. 2. A state diagram of an example finite state machine is described using FIG. 3. Another example integrated circuit is described using FIG. 4. Three timing diagrams of an example delayed signal are described using FIGS. 5-7. FIG. 8 is used to describe an example method of testing an analog delay circuit.

FIG. 1 illustrates an example integrated circuit that includes an analog delay circuit, a test circuit configured to test the analog delay circuit, and a sampler register configured to output a sample signal indicating the relationship between a signal to be delayed and at least the final delay phase of the analog delay circuit in accordance with embodiments of the invention.

Referring to FIG. 1, an integrated circuit 100 includes an analog delay circuit 110 (DLY) and a DFT circuit 106 configured to test the analog delay circuit 110. For example, the integrated circuit 100 may be any type of device that includes circuit elements (e.g. electronic, photonic) that are integrated into a monolithic substrate, such as a semiconductor substrate (e.g., silicon, germanium, gallium arsenide, silicon carbide, etc.). In various embodiments, the integrated circuit 100 is an SoC, and the integrated circuit 100 is an automotive SoC in one embodiment. Of course, the integrated circuit 100 may have any number of uses and applications and include a delay circuit and a test circuit configured to test the delay circuit.

The analog delay circuit 110 is configured to receive a signal to be delayed 50 (e.g. a clock signal 51, as shown) at a delay circuit signal input 116 and output a delayed signal 152 at delay outputs 112 (also labeled DLY_OUT[N−1:0]). Alternatively, the signal to be delayed 50 may be provided as a separate signal at an optional separate delay circuit signal input 17, which (e.g., functionally) may be a different clock signal or even an arbitrary periodic signal. It should be noted that a clock signal may be used to test the analog delay circuit 110 in order to provide a defined period while during normal operation, the analog delay circuit 110 may delay any signal. The duration of the delay (and any other delay configuration settings) may be provided at a delay configuration input 115. Although shown and described as an analog circuit here and in the following, the analog delay circuit 110 may be a digital circuit or include digital components.

The signal to be delayed 50 may be provided internally (e.g., using a configurable phase-locked loop (PLL), which is often already present in devices). For example, the integrated circuit 100 may include an optional test pad 62 that allows an external clock signal 63 to be supplied for testing the analog delay circuit 110. Alternatively, the integrated circuit 100 may include an optional PLL circuit 60 that generates an internal clock signal 61. Use of the internal clock signal 61 may advantageously allow testing of the analog delay circuit 110 at system speeds (while the frequency of the external clock signal 63 may be somewhat limited by parasitic capacitance, such as to about 100 MHz, for example). The signal to be delayed 50 may have any periodicity, but is high frequency in some embodiments. In one embodiment, the frequency of the signal to be delayed 50 is greater than 100 MHz. In another embodiment, the frequency of the signal to be delayed 50 is greater than 250 MHz, but the frequency of the signal to be delayed 50 may be still higher, such as greater than 1 GHz, and higher.

The analog delay circuit 110 is a multiphase delay circuit including a plurality of delay phases (i.e., at least an initial phase and a final phase, and may include one or more intermediate phases). While in some applications only the final delayed signal of the analog delay circuit 110 will be used, the delayed signal 152 output by the analog delay circuit 110 includes a plurality of delayed signals (e.g. N output clocks where N>1) at the delay outputs 112. That is, the analog delay circuit 110 generates a plurality of delayed signals that are incrementally phase shifted relative to the signal to be delayed 50. Each delay signal may be shifted by a "delay unit" responsible for a "delay phase" of the analog delay circuit 110. Any number of delay phases greater than one may be included in the analog delay circuit 110. The delay introduced by the delay units may be digitally programmable (e.g., by a common configuration).

The DFT circuit 106 may be or include a BIST circuit. The DFT circuit 106 includes a test circuit 120 (TEST) that is coupled to the analog delay circuit 110. The test circuit 120 is a BIST circuit (e.g., a so-called programmable delay BIST) in some embodiments, and the test circuit 120 is a BIST FSM in one embodiment. The test circuit 120 outputs a configuration signal 155 (also labeled DLY_CFG) at a delay configuration output 125 that is received at the delay configuration input 115 of the analog delay circuit 110. The DFT circuit 106 may test the analog delay circuit 110 by implementing a so called "tuning" procedure. Such a procedure may be otherwise performed by a test user.

During the tuning procedure, the test circuit 120 sequentially increments a programmable code, which is used to configure the delay (using the delay configuration input 115). The configuration signal 155 may specify a total delay duration, a delay duration for all delay phases, or individual delay durations for each delay phase. The test circuit 120 may ramp up the delay of the analog delay circuit 110 (e.g., iterate selected delay values from a starting value (e.g., 0) up to a maximum delay value, which may be defined by specification, by hardware capabilities, etc.).

The test circuit 120 indicates that the analog delay circuit 110 passes the test in response to determining that the relationship between the signal to be delayed 50 and the delayed signal 152 matches a predetermined criterion. For example, when (or if) the delay (e.g. phase shift) between the delay circuit signal input 116 and the Nth output of the delay outputs 112 (DLY_OUT[N−1], the largest possible delay) is equal to or exceeds a threshold delay duration, the analog delay circuit 110 passes the test. In one embodiment, the predetermined criterion is at least a one period delay, but of course other criteria are possible.

The test circuit 120 may determine if the predetermined criterion is met by comparing a "signature" sequence of bits (e.g., a signature N-bit value indicating that a delay threshold has been met) to a sequence of bits of a sample signal 158 (e.g. an N-bit value corresponding to the N delay phases sampled at a predetermined instant relative to the signal to be delayed). The signature sequence may be programmable in some embodiments. Additionally, one or more bits of the signature sequence may be selectively masked (e.g., not considered when determining that the relationship matches the predetermined criterion).

The integrated circuit 100 also includes a sampler register 130 (SMP). The sampler register 130 receives the delayed signal 152 at delay inputs 132 and outputs the sample signal 158 (also labeled PHASE[N−1:0]) at test result outputs 138 coupled to respective test result inputs 128 of the test circuit 120. The sampler register 130 may be included in the DFT circuit 106 (as shown) or may be a functional circuit that is included in the analog delay circuit 110 or in another part of the integrated circuit 100.

The sampler register 130 also includes a sampler register signal input 136 (e.g. a clock signal input) that receives the signal to be delayed 50 and uses it to generate the sample signal 158. For example, the sample signal 158 indicates a relationship between the signal to be delayed 50 and at least the total delay of the analog delay circuit 110 (e.g., the final delay phase of a plurality of delay phases). Of course, the sample signal 158 may indicate additional information, such as the relationship of each delay phase with the signal to be delayed 50.

Each of the analog delay circuit 110, the test circuit 120, and the sampler register 130 may receive the clock signal 51. As already mentioned, the clock signal 51 may be received as the signal to be delayed 50 (e.g., in the case of the analog delay circuit 110 and the sampler register 130) or may simply be received at a clock input (e.g., as shown, in order to operate the test circuit 120). The clock signal 51 may be generated by a PLL circuit (such as the optional PLL circuit 60). In some embodiments, one or more of the analog delay circuit 110, the test circuit 120, and the sampler register 130 may be clocked by a PLL circuit included in the integrated circuit 100, while the signal to be delayed 50 may be provided externally (e.g., by optional test pad 62).

The integrated circuit 100 may also include a test data register 140 (TDR) that is configured to store test data. The test data register 140 receive a status signal 157 (also labeled TEST_STS) from the test circuit 120 that indicates the status of the test circuit 120. For example, the status signal 157 may include status flags tracking information such as if the testing procedure is running, whether the analog delay circuit 110 has passed or failed, what state of the FSM the test circuit 120 is in, among others. The test data register 140 may also store delay tuning data (e.g., the selected delay value that is currently being tested, output by the test circuit 120 to the test data register 140). If/when the analog delay circuit 110 passes the test, the selected delay value stored as delay tuning value in the test data register 140 may then indicate the particular selected delay value associated with matching the predetermined criterion (e.g., that results in matching the predetermined criterion) allowing the analog delay circuit 110 to be tuned accordingly. That is, a user could input the delay tuning value (or the tuning value could be automatically set) so that the analog delay circuit 110 behaves according to specification.

The test data register 140 may also control behavior of the test circuit 120 by outputting a control signal 156 (also labeled TEST_CTRL) to the test circuit 120. For example, the test circuit 120 may read various test data, such as flags from the test data register 140 to control testing of the analog delay circuit 110 (e.g., control execution of the tuning procedure).

Figure 2:
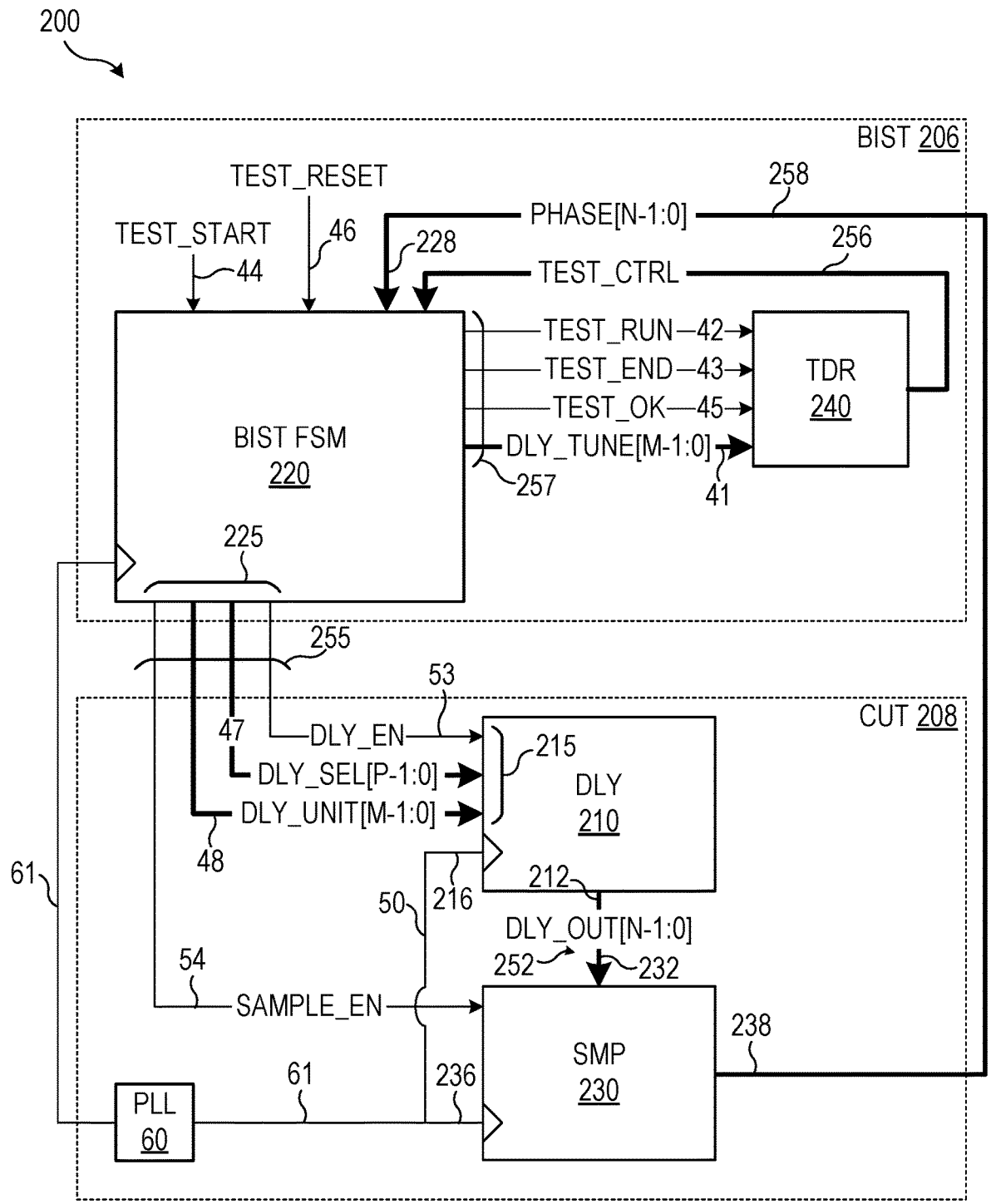
FIG. 2 illustrates an example integrated circuit that includes an analog delay circuit with a sampler register configured to output a sample signal indicating the relationship between a signal to be delayed and at least the final delay phase of the analog delay circuit, and a test circuit implemented as a built-in self-test finite state machine and configured to test the analog delay circuit in accordance with embodiments of the invention.

FIG. 2 illustrates an example integrated circuit that includes an analog delay circuit with a sampler register configured to output a sample signal indicating the relationship between a signal to be delayed and at least the final delay phase of the analog delay circuit, and a test circuit implemented as a built-in self-test finite state machine and configured to test the analog delay circuit in accordance with embodiments of the invention. The integrated circuit of FIG. 2 may be a specific implementation of other integrated circuits described herein such as the integrated circuit of FIG. 1, for example. Similarly labeled elements may be as previously described.

Referring to FIG. 2, an integrated circuit 200 includes a circuit under test 208 (CUT) and a DFT circuit 206. The circuit under test 208 includes an analog delay circuit 210 coupled to a sampler register 230, and a PLL circuit 60 that provides an internal clock signal 61 to both the analog delay circuit 210 at a delay circuit signal input 216 and the sampler register 230 at a sampler register signal input 236. Here, the internal clock signal 61 is also the signal to be delayed 50. The DFT circuit 206 includes a test circuit 220 coupled to a test data register 240. The test circuit 220 outputs a configuration signal 255 at a delay configuration output 225 that is received by the analog delay circuit 210 of the circuit under test 208 at a delay configuration input 215. The internal clock signal 61 is also provided to the test circuit 220 (e.g. for operation of the test circuit 220).

It should be noted that here and in the following a convention has been adopted for brevity and clarity wherein elements adhering to the pattern [x20] where 'x' is the figure number may be related implementations of a test circuit in various embodiments. For example, the test circuit 220 may be similar to the test circuit 120 except as otherwise stated. An analogous convention has also been adopted for other elements as made clear by the use of similar terms in conjunction with the aforementioned numbering system.

In this specific example, the DFT circuit 206 is implemented as a BIST and the test circuit 220 is implemented as an FSM (finite state machine) of the BIST. A start signal 44 (TEST_START) may be provided to the test circuit 220 that initiates the testing procedure (e.g., a user may provide the signal). Additionally, a reset signal 46 (TEST_RESET) that resets the test circuit 220 may be similarly provided. Both the start signal 44 and the reset signal 46 may also be provided from the test data register 240. For example, the test circuit 220 may be configured to maintain an idle state while a BIST start flag (TEST_START) is disabled, and begin testing the analog delay circuit 210 in response to receiving the start signal 44 that enables the BIST start flag.

The test circuit 220 outputs a status signal 257 to the test data register 240 that may include various information indicating the status of the test circuit 220 (and of a test procedure being executed) such as status flags and delay configuration information. The data stored in the test data register 240 may be readable by the test circuit 220 using a control signal 256 that is output from the test data register 240 to the test circuit 220.

For example, the status signal 257 may include a run signal 42 (TEST_RUN) that may indicate that a test procedure (e.g., a tuning procedure) is in progress, an end signal 43 (TEST_END) that may indicate whether the test procedure has ended, a status signal 45 (TEST_OK) that may indicate whether the analog delay circuit 210 of the circuit under test 208 has passed the test, and others.

The status signal 257 may also include delay tuning data 41 (e.g., a sequence of M bits DLY_TUNE[M−1:0], such as 7 bits, the length of which may depend on the specific delay capabilities of the analog delay circuit 210). The delay tuning data 41 may correspond to a selected delay value that is being used or has already been used in the testing procedure. For example, when the testing procedure is also a tuning procedure, the delay tuning data 41 may be stored as a delay tuning value at each iteration of the tuning procedure. If/when the analog delay circuit 210 passes the test, the stored delay tuning value indicates the delay configuration that matches the predetermined criterion of the testing procedure (and hence may be used as a tuning value to tune the analog delay circuit 210).

The configuration signal 255 may include various information, such as a selected delay value 47 (e.g., a sequence of P bits DLY_SEL[P−1:0], such as 4 bits indicating the number of delay units used in the delay path), a delay unit 48 (e.g., a sequence of M bits DLY_UNIT[M−1:0] indicating the duration of the unit delay (how much delay each delay unit introduces) during iteration of the range of tested delay values), a delay enable signal 53, a sampler enable signal 54, and others. The delay enable signal 53 (DLY_EN) may be used to enable the analog delay circuit 210 while the sampler enable signal 54 (SAMPLE_EN) may be used to enable the sampler register 230. Of course, one or more of the delay enable signal 53 and the sampler enable signal 54 may not be needed in certain implementations.

The analog delay circuit 210 delays the signal to be delayed 50 received at the delay circuit signal input 216 according to the configuration signal 255 and outputs a delayed signal 252 at delay outputs 212 that are received at delay inputs 232 of the sampler register 230. The sampler register 230 receives the delayed signal 252 and outputs a sample signal 258 at test result outputs 238 that is received at test result inputs 228 of the test circuit 220 of the DFT circuit 206.

The implementation of the test circuit 220 as a BIST FSM may have various benefits such as requiring minimum external configuration. For example, a user may only provide an input clock signal (which may also the clock signal input to the analog delay circuit 210, as shown) and trigger the BIST execution (e.g., release the FSM reset (TEST_RESET) and raise a start signal to execute the BIST routine (TEST_START)). The FSM provides as an output the BIST execution status (typically a pass/fail result flag (TEST_OK) and a flag indicating the BIST ended (TEST_END), while another flag may indicate when the BIST is still running (TEST_RUN), but of course other interfaces may be adopted. Further, the DFT circuit 206 implemented as a BIST circuit may be configured to periodically test the analog delay circuit 210 in the field to confirm that the analog delay circuit 210 continues to pass the test.

Figure 3:
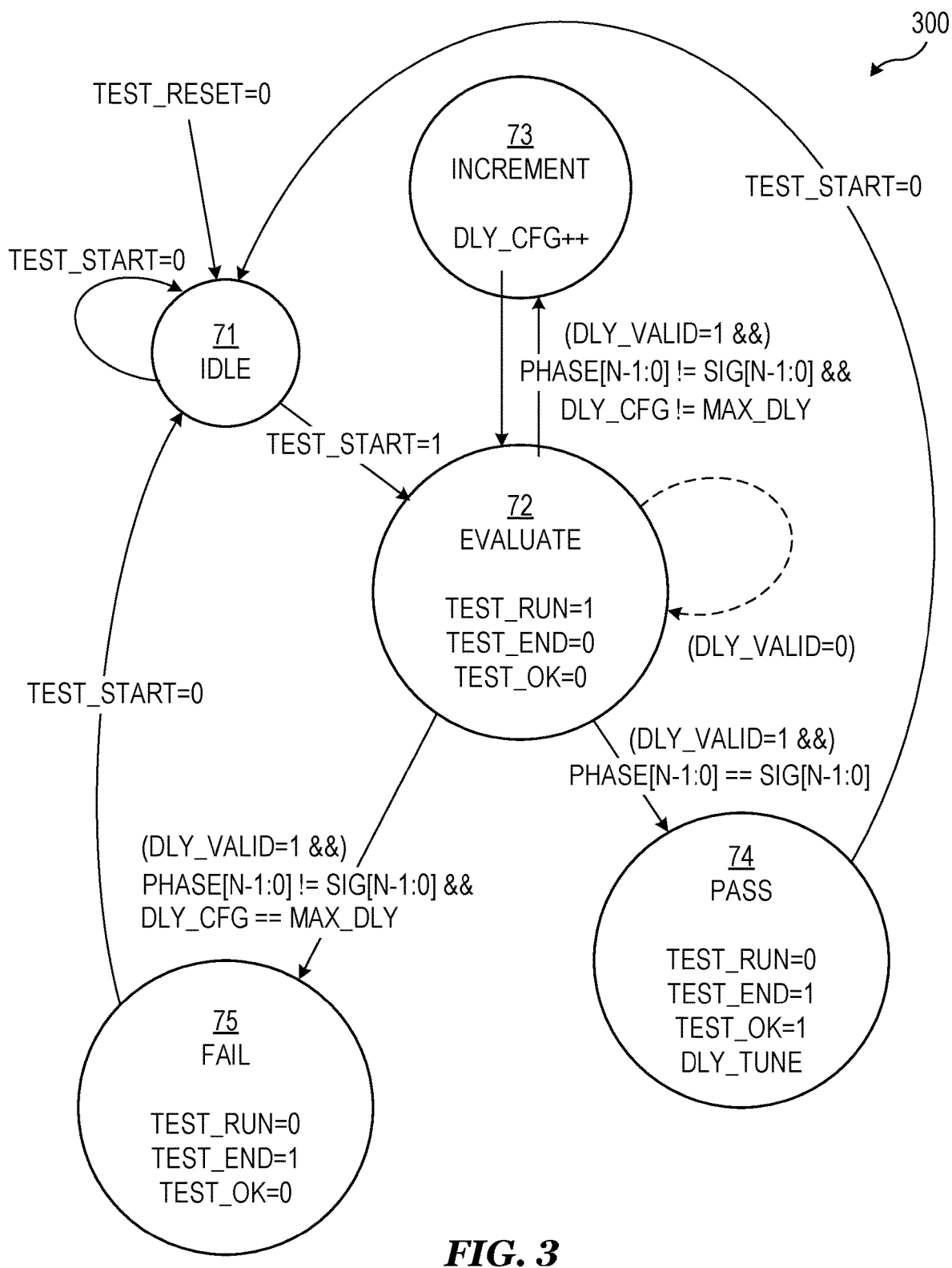
FIG. 3 illustrates a state diagram conceptually depicting the behavior of an example finite state machine configured to test an analog delay circuit in accordance with embodiments of the invention.

FIG. 3 illustrates a state diagram conceptually depicting the behavior of an example finite state machine configured to test an analog delay circuit in accordance with embodiments of the invention. The state diagram of FIG. 3 may conceptually depict the behavior of the finite state machines described herein such as the test circuit implemented as a finite state machine of FIG. 2, for example. Similarly labeled elements may be as previously described.

Referring to FIG. 3, a state diagram 300 shows five states of an example finite state machine of a test circuit that is used to test a delay circuit. The state diagram 300 includes an idle state 71, which may be the default state that the test circuit is in when no test procedure is being executed. A start flag TEST_START may be zero while in the idle state 71. A reset flag TEST_RESET may place the test circuit in the idle state 71 when it is set to zero, as shown.

When TEST_START is set to 1, the test circuit may begin the test procedure by moving to an evaluation state 72. In the evaluation state 72, the test circuit may produce a run flag to indicate that the test procedure is running (TEST_RUN=1), an end flag to indicate that the test procedure has not ended (TEST_END=0), and a status flag to indicate that the delay circuit has passed the test TEST_OK=1 (e.g., these flags may be outputs of the test circuit to a test data register and read from the test data register to determine the behavior of the test circuit). After verifying the state of the test circuit, the test circuit may test the delay circuit with the current selected delay configuration (e.g., evaluate a signature signal received from a sampler register).

Optionally, a validity flag DLY_VALID may be used to indicate whether the delay signals that are being sampled are stable and reliable. For example, the validity flag could be provided by the delay circuit itself or be generated by the test circuit. The validity flag may be beneficial to allow for some transition time from one configuration to another of the delay circuit (e.g., when it is an analog delay circuit). When DLY_VALID=0, the test circuit may remain in the evaluation state 72 (e.g., waiting for the delay signals to become valid).

The test circuit may iterate through a range of delay configurations by transitioning back and forth between the evaluation state 72 and an incrementation state 73. Specifically, when the sample signal PHASE[N−1:0] does not equal the signature sequence SIG[N−1:0] and the maximum delay configuration has not been reached (DLY_CFG does not equal MAX_DLY), the test circuit may increment the delay configuration (DLY_CFG++). When the validity flag is used, the test circuit may also make sure that DLY_VALID=1 before incrementing the delay configuration.

If the evaluation state 72 determines that the sample signal PHASE[N−1:0] is equal to the signature sequence SIG[N−1:0] (and, optionally, that DLY_VALID=1), then the test circuit may recognize that the delay circuit has passed the test (TEST_OK=1) and move to a pass state 74. For example, as previously discussed, if the predetermined criterion of the signature sequence (e.g., a delay duration of at least one period) is met, then the delay circuit passes the test. In the pass state 74, the test procedure has ended (TEST_END=1) so it is not running (TEST_RUN=0). Additionally, when the test procedure is also a tuning procedure, delay tuning data (DLY_TUNE) may be stored. From the pass state 74, the TEST_START may be set to zero and the test circuit may enter the idle state 71.

On the other hand, if the delay configuration reaches the maximum delay configuration (DLY_CFG is equal to MAX_DLY) and the sample signal is still not equal to the signature signal (PHASE[N−1:0] does not equal SIG[N−1:0]) (and, optionally, DLY_VALID=1), then the test circuit may recognize that the delay circuit has failed and enter a fail state 75 (TEST_OK=0). Again, TEST_RUN is now zero and TEST_END=1. From the fail state 75, the test circuit may revert to the idle state 71 (e.g., when TEST_START=0).

Figure 4:
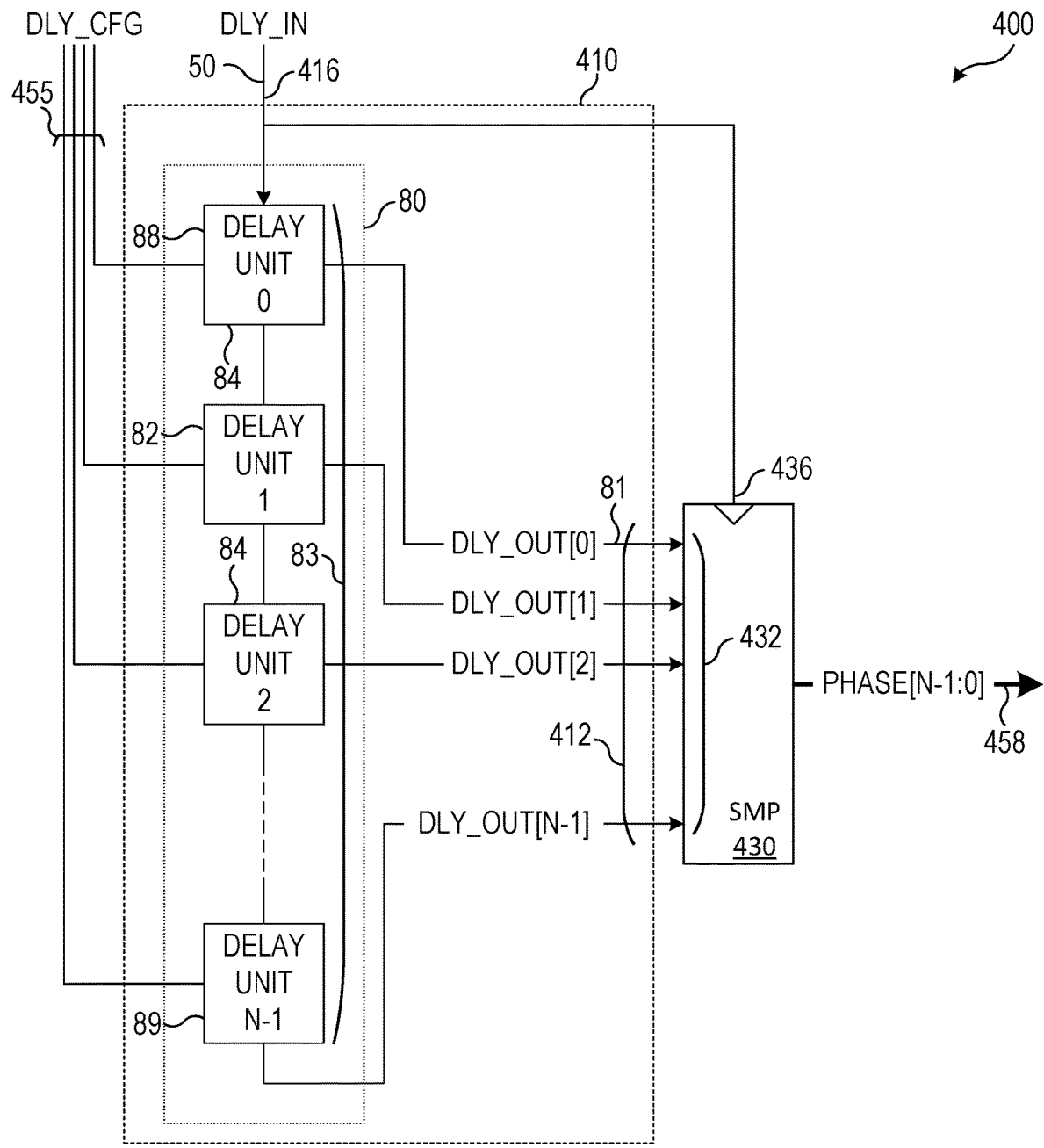
FIG. 4 illustrates an example integrated circuit that includes an analog delay circuit with a delay line of delay phases including an initial delay phase and a final delay phase with optional intermediate delay phases therebetween in accordance with embodiments of the invention.

FIG. 4 illustrates an example integrated circuit that includes an analog delay circuit with a delay line of delay phases including an initial delay phase and a final delay phase with optional intermediate delay phases therebetween in accordance with embodiments of the invention. The integrated circuit of FIG. 4 may be a specific implementation of other integrated circuits described herein such as the integrated circuit of FIG. 1, for example. Similarly labeled elements may be as previously described.

Referring to FIG. 4, an integrated circuit 400 includes an analog delay circuit 410 that is implemented using a delay line 80. The delay line 80 has a plurality of delay phases 83. Each of the delay phases 83 is a delay phase 84 formed from a delay unit. The signal to be delayed 50 received at a delay circuit signal input 416 is propagated through the delay line 80 starting with an initial delay phase 88 and ending with a final delay phase 89 resulting in delay outputs 412. Optionally, one or more intermediate delay phases 82 may be included. Intermediate delayed signals are also output between each of the intermediate delay phases 82. The final delayed signal (PHASE[N−1]) is the longest duration (e.g. has the largest shift relative to the signal to be delayed 50).

Each of the intermediate delay phase 82 may be configured (e.g., the analog delay circuit 410 is programmable) using a configuration signal 455. The configuration may be common so that each delay introduces the same configured delay, (e.g., 10 ns), but of course this does not have to be the case. The configuration signal 455 may select one or more of the intermediate delay phases 82 to introduce the delay (e.g., the signal passes through the intermediate delay phases 82 that are not selected without being delayed).

The delay outputs 412 may be output to a sampler register 430, which may be similar to the sampler registers already described. For example, the sampler register 430 may be a specific implementation of the sampler register 130 of FIG. 1. The sampler register 430 receives the delay outputs 412 and the signal to be delayed 50 as inputs (delay inputs 432 and sampler register signal input 436, respectively) and outputs a sample signal 458, as shown.

Figure 5:
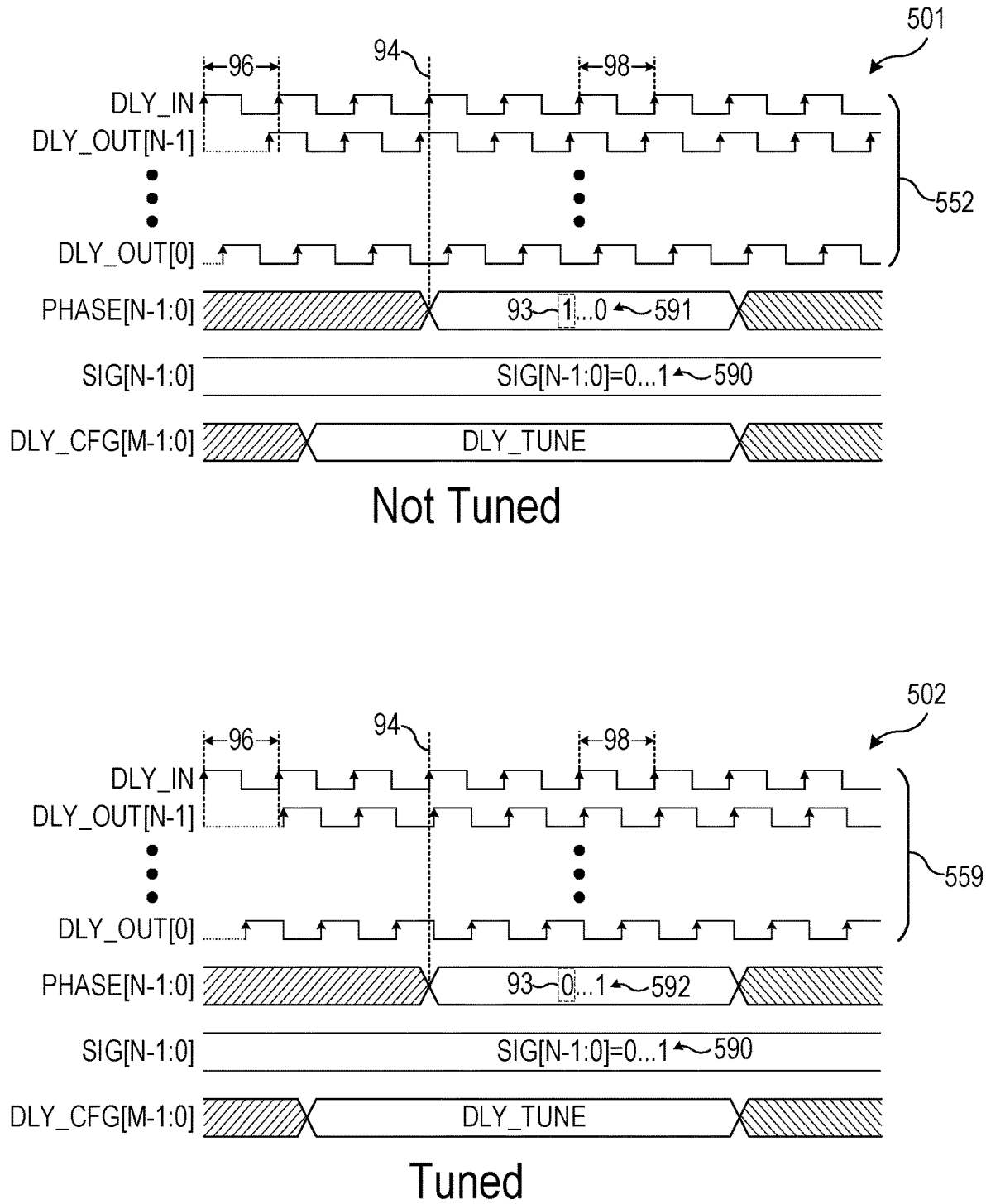
FIG. 5 illustrates an example schematic timing diagram of a tuned delayed signal and an example schematic timing diagram of a delayed signal that is not tuned where the delayed signals include N delayed phases in accordance with embodiments of the invention.

FIG. 5 illustrates an example schematic timing diagram of a tuned delayed signal and an example schematic timing diagram of a delayed signal that is not tuned where the delayed signals include N delayed phases in accordance with embodiments of the invention. The delayed signals shown in the timing diagram of FIG. 5 may be a specific implementation of any of the delayed signals described herein such as the delayed signal of FIG. 1, for example. Similarly labeled elements may be as previously described.

Referring to FIG. 5, a "not tuned" timing diagram 501 includes a delayed signal 552 that has at least two phases (DLY_OUT[0] and DLY_OUT[N−1]). One or more intermediate phases may also be included (i.e., N may be greater than 2). A signal to be delayed is input into the delay circuit (DLY_IN) and has a signal period 98. A delay threshold 96 (the predetermined criterion) is equal to the signal period 98 here, though equivalence is not a strict requirement. As shown, the final phase DLY_OUT[N−1] is not shifted a full signal period. As a result, the delayed signal 552 is not tuned.

A test circuit determines that the delayed signal 552 is not tuned using a sample signal PHASE[N−1:0] and a signature signal SIG[N−1:0]. For example, the sample signal and the signature signal each include a sequence of bits 93. At a predetermined instant 94, (here corresponding to the rising edge of a pulse of DLY_IN), the sample signal PHASE[N−1:0] is output. Because in this example, the delayed signal 552 is not tuned (fails the test) PHASE[N−1:0] includes a failing sequence of bits 591 (1 . . . 0) which does not match the signature sequence 590 (0 . . . 1) of the signature signal SIG[N−1:0]. In contrast, a "tuned" timing diagram 502 shows a delayed signal 559 that generates a sample signal with a passing sequence of bits 592 (0 . . . 1) that matches the signature sequence 590 (0 . . . 1).

Figure 6:
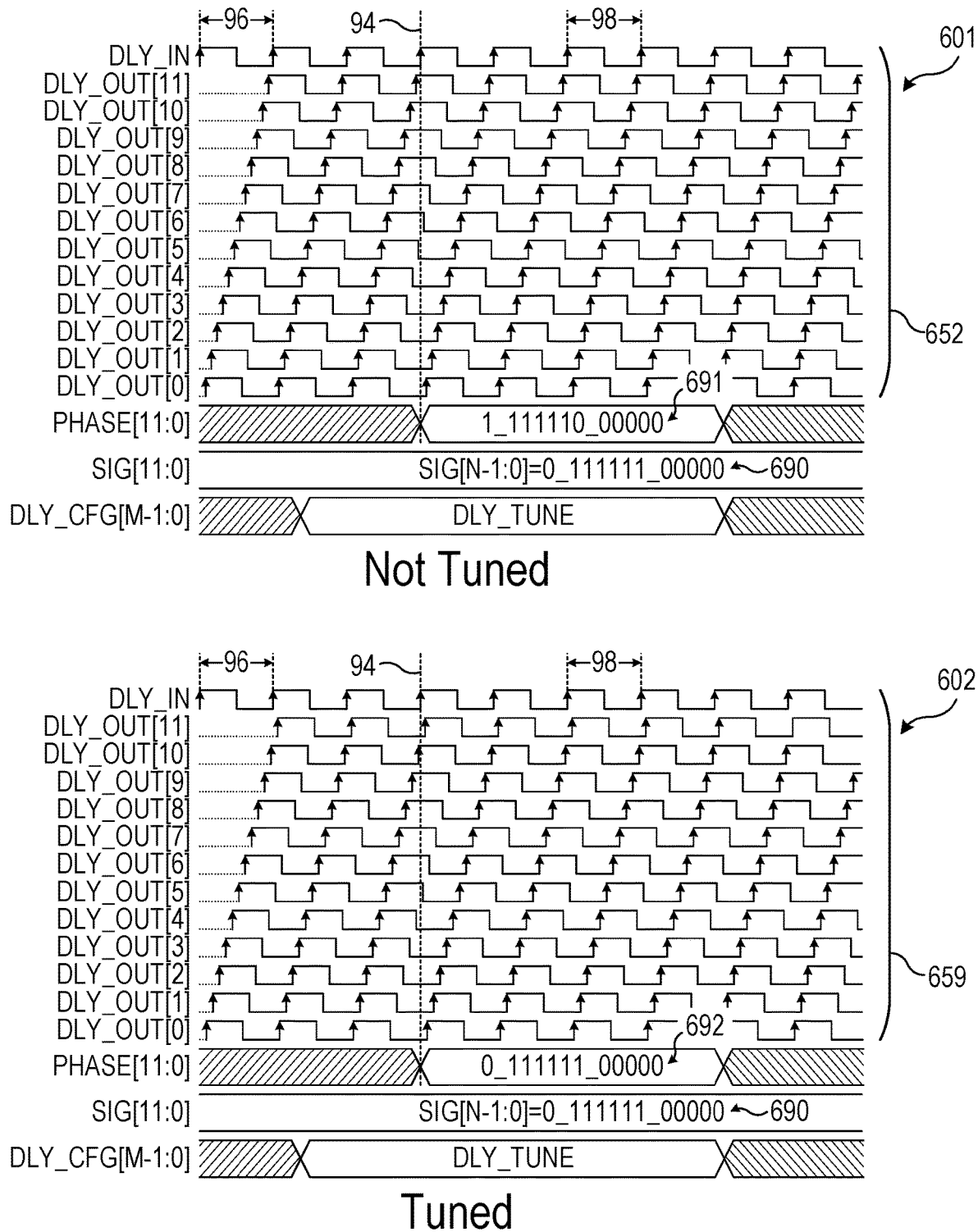
FIG. 6 illustrates another example schematic timing diagram of a tuned delayed signal and an example schematic timing diagram of a delayed signal that is not tuned where the delayed signals include 12 delayed phases in accordance with embodiments of the invention.

FIG. 6 illustrates another example schematic timing diagram of a tuned delayed signal and an example schematic timing diagram of a delayed signal that is not tuned where the delayed signals include 12 delayed phases in accordance with embodiments of the invention. The delayed signals shown in the timing diagram of FIG. 6 may be a specific implementation of any of the delayed signals described herein such as the delayed signal of FIG. 1, for example. Similarly labeled elements may be as previously described.

Referring to FIG. 6, a "not tuned" timing diagram 601 includes a delayed signal 652 that has twelve phases (DLY_OUT[0] through DLY_OUT[11]). A test circuit determines that the delayed signal 652 is not tuned using a sample signal PHASE[11:0] and a signature signal SIG[11:0]. Because in this example, the delayed signal 652 is not tuned (fails the test) PHASE[11:0] includes a failing sequence of bits 691 (1_111110_00000) which does not match the signature sequence 690 (0_111111_00000) of the signature signal SIG[11:0]. In contrast, a "tuned" timing diagram 602 shows a delayed signal 659 that generates a sample signal with a passing sequence of bits 692 (0_111111_00000) that matches the signature sequence 690 (0_111111_00000).

Reading more than just the last phase (e.g., reading the whole signature) may advantageously give additional information regarding the uniformity of the delays for the phases. The signature sequence 690 may be substantially evenly split, as shown, but this is not required. For example, an even split may indicate the uniformity of the phases of the delay circuit, but it is conceivable that delay phases with different delays could be used. If one of the delay phases is not uniform, the balance may be altered (e.g., shifted early or late) and the signature sequence 690 may not be obtained.

Figure 7:
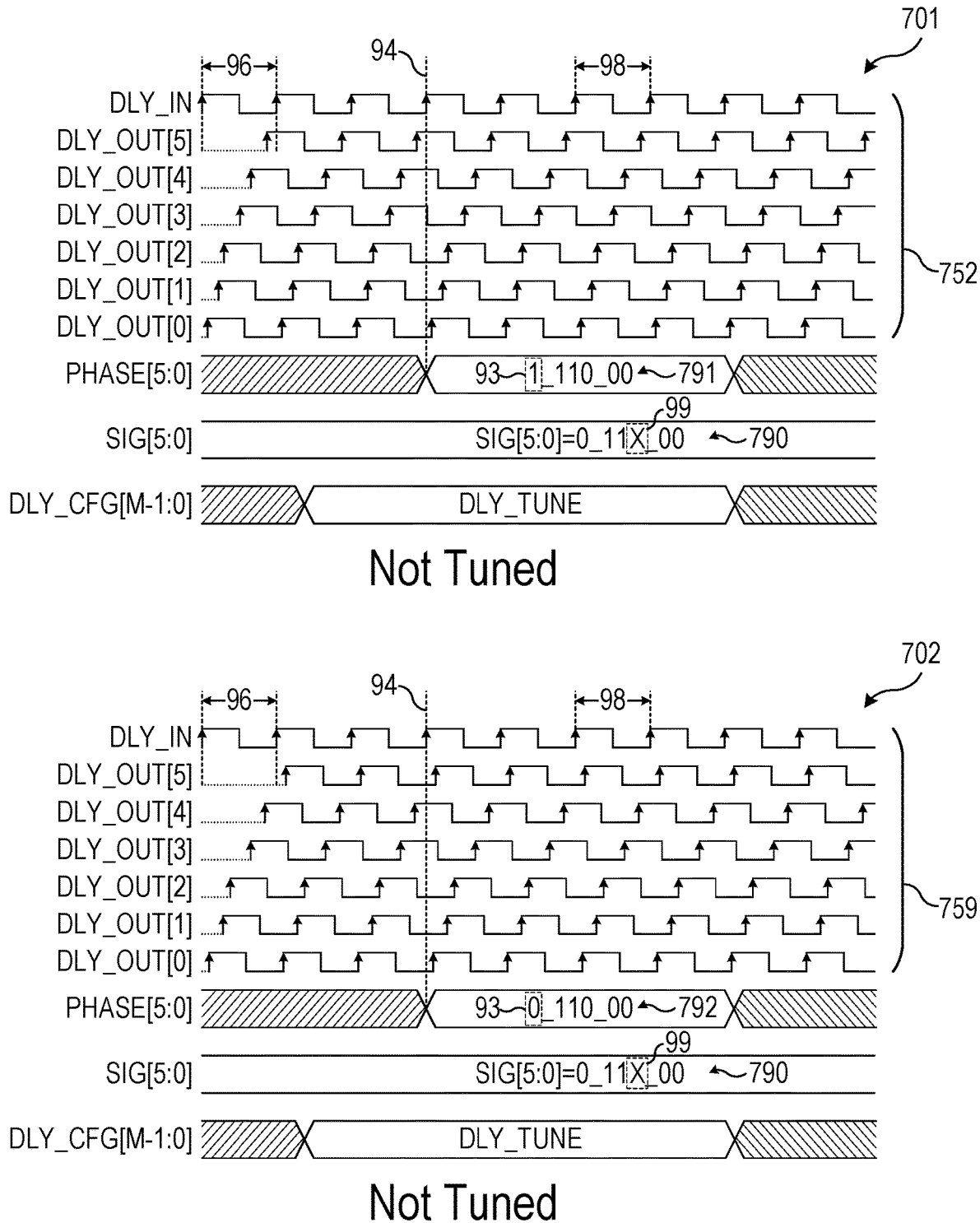
FIG. 7 illustrates still another example schematic timing diagram of a tuned delayed signal and an example schematic timing diagram of a delayed signal that is not tuned where the delayed signals include 6 delayed phases and bit masking is used in accordance with embodiments of the invention.
Figure 8:
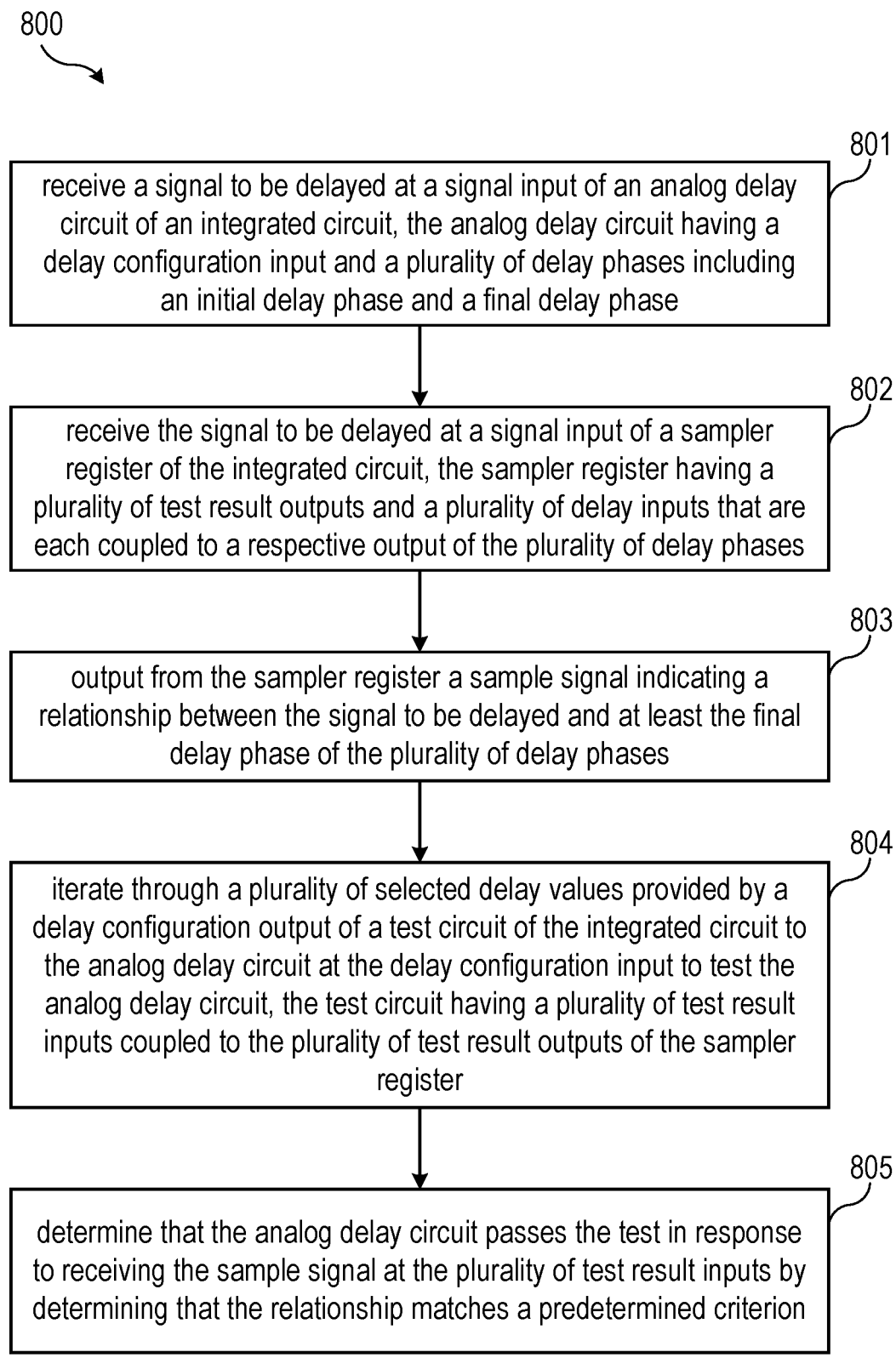
FIG. 8 illustrates an example method of testing an analog delay circuit of an integrated circuit in accordance with embodiments of the invention.

FIG. 7 illustrates still another example schematic timing diagram of a tuned delayed signal and an example schematic timing diagram of a delayed signal that is not tuned where the delayed signals include 6 delayed phases and bit masking is used in accordance with embodiments of the invention. The delayed signals shown in the timing diagram of FIG. 7 may be a specific implementation of any of the delayed signals described herein such as the delayed signal of FIG. 1, for example. Similarly labeled elements may be as previously described.

Referring to FIG. 7, a "not tuned" timing diagram 701 includes a delayed signal 752 that has six phases (DLY_OUT[0] through DLY_OUT[5]). A test circuit determines that the delayed signal 752 is not tuned using a sample signal PHASE[5:0] and a signature signal SIG[5:0]. The signature signal SIG[5:0] includes a signature sequence 790. In this example, the optional capability of programming the signature sequence 790 is demonstrated. Specifically, the signature sequence 790 may include a masked bit 99 (or more than one masked bit 99). The masked bit 99 is shown as an "X" (e.g., don't care) indicating that the masked bit 99 is not considered when comparing the signature sequence 790 to the sample signal.

Because in this example the delayed signal 752 is not tuned (fails the test) PHASE[5:0] includes a failing sequence of bits 791 (1_110_00) which does not match the signature sequence 690 (0_11X_00) of the signature signal SIG[5:0] (even ignoring the masked bit 99). In contrast, a "tuned" timing diagram 702 shows a delayed signal 759 that generates a sample signal with a passing sequence of bits 792 (0_110_00) that matches the signature sequence 690 (0_11X_00).

Notably, the delay phases are not uniform in this example. Without the masked bit 99, the passing sequence of bits 792 would fail to pass the test (e.g., the signature sequence 790 may be 0_111_00 without masking). However, masking a bit allowed the overall outcome of the test to be a pass even though the uniformity to the delay phases was not sufficient to pass without masking (e.g., the silicon is not precise enough). Thus, masking may be advantageous for situations where the total delay is more important than phase uniformity, or for debug purposes, or also to cope with process variability in integrated circuit production.

FIG. 8 illustrates an example method of testing an analog delay circuit of an integrated circuit in accordance with embodiments of the invention. The method of FIG. 8 may be combined with other methods and performed using the systems and apparatuses as described herein. For example, the method of FIG. 8 may be combined with any of the embodiments of FIGS. 1-7. Although shown in a logical order, the arrangement and numbering of the steps of FIG. 8 are not intended to be limited. The method steps of FIG. 8 may be performed in any suitable order or concurrently with one another as may be apparent to a person of skill in the art.

Referring to FIG. 8, a method 800 of testing an analog delay circuit of an integrated circuit includes a step 801 of receiving a signal to be delayed at a signal input of the analog delay circuit. The analog delay circuit includes a delay configuration input and a plurality of delay phases that include an initial delay phase and a final delay phase. In step 802, the signal to be delayed is received at a signal input of a sampler register of the integrated circuit. Step 801 and step 802 may be substantially simultaneous, for example. The sampler register includes a plurality of test result outputs and a plurality of delay inputs that are each coupled to a respective output of the plurality of delay phases.

Step 803 includes outputting a sample signal from the sampler register indicating a relationship between the signal to be delayed and at least the final delay phase of the plurality of delay phases. The method 800 iterates through a plurality of selected delay values in step 804. The plurality of selected delay values is provided by a delay configuration output of a test circuit of the integrated circuit to the analog delay circuit at the delay configuration input to test the analog delay circuit. The test circuit includes a plurality of test result inputs coupled to the plurality of test result outputs of the sampler register. In step 805, the analog delay circuit is determined to have passed the test in response to receiving the sample signal at the plurality of test result inputs. For example, passing may be determined by determining that the relationship matches a predetermined criterion.

Example embodiments of the invention are summarized here. Other embodiments can also be understood from the entirety of the specification as well as the claims filed herein.

Example 1. An integrated circuit including: an analog delay circuit including a plurality of delay phases, a delay configuration input, and a signal input configured to receive a signal to be delayed, the plurality of delay phases including an initial delay phase and a final delay phase; a sampler register including a signal input configured to receive the signal to be delayed, a plurality of test result outputs, and a plurality of delay inputs that are each coupled to a respective delay output of the plurality of delay phases, the sampler register being configured to output a sample signal indicating a relationship between the signal to be delayed and at least the final delay phase of the plurality of delay phases; and a test circuit including a delay configuration output coupled to the delay configuration input of the analog delay circuit, and a plurality of test result inputs coupled to the plurality of test result outputs of the sampler register, the test circuit being configured to iterate through a plurality of selected delay values provided to the analog delay circuit at the delay configuration input to test the analog delay circuit, and determine that the analog delay circuit passes the test in response to receiving the sample signal at the plurality of test result inputs by determining that the relationship matches a predetermined criterion.

Example 2. The integrated circuit of example 1, where the sample signal is a sequence of bits corresponding to the delay outputs of the plurality of delay phases sampled at a predetermined instant relative to the signal to be delayed, and where the predetermined criterion is a signature sequence of bits indicating that a delay threshold has been met.

Example 3. The integrated circuit of example 2, where the signal to be delayed is a clock signal, and where the delay threshold is one period of the clock signal.

Example 4. The integrated circuit of one of examples 2 and 3, where the plurality of delay phases includes at least one intermediate delay phase, and where at least one of the sequence of bits corresponding to the at least one intermediate delay phase is masked and not considered when determining that the relationship matches the predetermined criterion.

Example 5. The integrated circuit of one of examples 1 to 4, where the signal to be delayed is a clock signal.

Example 6. The integrated circuit of example 5, further including: a phase-locked loop (PLL) circuit configured to generate the clock signal and provide the clock signal as the signal to be delayed to the analog delay circuit and to the sampler register.

Example 7. The integrated circuit of example 6, where the test circuit is configured to operate using the clock signal.

Example 8. The integrated circuit of example 5, further including: a test pad configured to receive the clock signal and coupled to both the signal input of the analog delay circuit and to the signal input of the sampler register, the clock signal being an external clock signal.

Example 9. The integrated circuit of one of examples 1 to 8, further including: a test data register coupled to the test circuit, the test data register being configured to store delay tuning data, where the test circuit is further configured to output the delay tuning data, where the delay tuning data indicates a selected delay value of the plurality of selected delay values, the selected delay value being associated with matching the predetermined criterion.

Example 10. The integrated circuit of one of examples 1 to 9, where the signal to be delayed has a frequency greater than about 100 MHz.

Example 11. The integrated circuit of one of examples 1 to 10, where the sampler register is implemented as a functional circuit of the analog delay circuit.

Example 12. The integrated circuit of one of examples 1 to 11, where the sampler register is implemented as a dedicated design for testing (DFT) circuit.

Example 13. The integrated circuit of one of examples 1 to 12, where the test circuit is a built-in self-test (BIST) circuit.

Example 14. The integrated circuit of one of examples 1 to 13, where the integrated circuit is an automotive system on a chip (SoC).

Example 15. The integrated circuit of one of examples 1 to 14, where the plurality of delay phases includes more than two delay phases.

Example 16. The integrated circuit of example 15, where the plurality of delay phases has twelve delay phases.

Example 17. A built-in self-test (BIST) circuit including: a sampler register including a signal input configured to receive a signal to be delayed, a plurality of test result outputs, and a plurality of delay inputs that are each configured to be coupled to a respective delay output of a plurality of delay phases of an analog delay circuit, the sampler register being configured to output a sample signal indicating a relationship between the signal to be delayed and at least a final delay phase of the plurality of delay phases; a finite state machine circuit including a delay configuration output configured to be coupled to a delay configuration input of the analog delay circuit, and a plurality of test result inputs coupled to the plurality of test result outputs of the sampler register, the finite state machine circuit being configured to iterate through a plurality of selected delay values provided to the analog delay circuit at the delay configuration input to test the analog delay circuit, determine that the analog delay circuit passes the test by determining that the relationship matches a predetermined criterion in response to receiving the sample signal at the plurality of test result inputs, and output delay tuning data indicating a selected delay value of the plurality of selected delay values, the selected delay value being associated with matching the predetermined criterion; a test data register coupled to the finite state machine circuit, the test data register being configured to store status flags of the finite state machine circuit and the delay tuning data.

Example 18. The BIST circuit of example 17, where the finite state machine circuit is further configured to maintain an idle state while a BIST start flag is disabled, and begin testing the analog delay circuit in response to receiving a start signal enabling the BIST start flag.

Example 19. The BIST circuit of example 18, where the BIST circuit is configured to periodically test the analog delay circuit in the field to confirm that the analog delay circuit continues to pass the test.

Example 20. The BIST circuit of one of examples 17 to 19, where the status flags include a pass/fail flag indicating whether the analog delay circuit has passed the test, a BIST run flag indicating whether the test is running, and a BIST end flag indicating if the test has ended.

Example 21. The BIST circuit of one of examples 17 to 20, where the sample signal is a sequence of bits corresponding to delay outputs of the plurality of delay phases sampled at a predetermined instant relative to the signal to be delayed, and where the predetermined criterion is a signature sequence of bits indicating that a delay threshold has been met.

Example 22. The BIST circuit of example 21, where the signature sequence of bits is programmable.

Example 23. The BIST circuit of example 22, where the plurality of delay phases includes at least one intermediate delay phase, and where at least one of the sequence of bits corresponding to the at least one intermediate delay phase is masked and not considered when determining that the relationship matches the predetermined criterion.

Example 24. A method of testing an analog delay circuit of an integrated circuit, the method including: receiving a signal to be delayed at a signal input of the analog delay circuit, the analog delay circuit including a delay configuration input and a plurality of delay phases including an initial delay phase and a final delay phase; receiving the signal to be delayed at a signal input of a sampler register of the integrated circuit, the sampler register including a plurality of test result outputs and a plurality of delay inputs that are each coupled to a respective output of the plurality of delay phases; outputting from the sampler register a sample signal indicating a relationship between the signal to be delayed and at least the final delay phase of the plurality of delay phases; iterating through a plurality of selected delay values provided by a delay configuration output of a test circuit of the integrated circuit to the analog delay circuit at the delay configuration input to test the analog delay circuit, the test circuit including a plurality of test result inputs coupled to the plurality of test result outputs of the sampler register; and determining that the analog delay circuit passes the test in response to receiving the sample signal at the plurality of test result inputs by determining that the relationship matches a predetermined criterion.

Example 25. The method of example 24, where outputting the sample signal includes outputting a sequence of bits corresponding to delay outputs of the plurality of delay phases sampled at a predetermined instant relative to the signal to be delayed, the predetermined criterion being a signature sequence of bits indicating that a delay threshold has been met.

Example 26. The method of example 25, where the plurality of delay phases includes at least one intermediate delay phase, and where at least one of the sequence of bits corresponding to the at least one intermediate delay phase is masked and not considered when determining that the relationship matches the predetermined criterion.

Example 27. The method of one of examples 25 and 26, where the signature sequence of bits is programmable.

Example 28. The method of one of examples 24 to 27, further including: maintain an idle state of the test circuit while a start flag is disabled; and beginning iterating through the plurality of selected delay values to test the analog delay circuit in response to receiving a start signal enabling the start flag.

Example 29. The method of example 28, further including: periodically testing the analog delay circuit in the field using the test circuit to confirm that the analog delay circuit continues to pass the test.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An integrated circuit comprising:
   an analog delay circuit comprising a plurality of delay phases, a delay configuration input, and a signal input configured to receive a signal to be delayed, the plurality of delay phases comprising an initial delay phase and a final delay phase;
   a sampler register comprising a signal input configured to receive the signal to be delayed, a plurality of test result outputs, and a plurality of delay inputs that are each coupled to a respective delay output of the plurality of delay phases, the sampler register being configured to
      output a sample signal indicating a relationship between the signal to be delayed and at least the final delay phase of the plurality of delay phases; and
   a test circuit comprising a delay configuration output coupled to the delay configuration input of the analog delay circuit, and a plurality of test result inputs coupled to the plurality of test result outputs of the sampler register, the test circuit being configured to
      iterate through a plurality of selected delay values provided to the analog delay circuit at the delay configuration input to test the analog delay circuit, and
      determine that the analog delay circuit passes the test in response to receiving the sample signal at the plurality of test result inputs by determining that the relationship matches a predetermined criterion.

2. The integrated circuit of claim 1, wherein the sample signal is a sequence of bits corresponding to the delay outputs of the plurality of delay phases sampled at a predetermined instant relative to the signal to be delayed, and wherein the predetermined criterion is a signature sequence of bits indicating that a delay threshold has been met.

3. The integrated circuit of claim 2, wherein the plurality of delay phases comprises at least one intermediate delay phase, and wherein at least one of the sequence of bits corresponding to the at least one intermediate delay phase is masked and not considered when determining that the relationship matches the predetermined criterion.

4. The integrated circuit of claim 1, wherein the signal to be delayed is a clock signal.

5. The integrated circuit of claim 4, further comprising:
   a phase-locked loop (PLL) circuit configured to generate the clock signal and provide the clock signal as the signal to be delayed to the analog delay circuit and to the sampler register.

6. The integrated circuit of claim 1, further comprising:
   a test data register coupled to the test circuit, the test data register being configured to store delay tuning data, wherein the test circuit is further configured to
      output the delay tuning data, wherein the delay tuning data indicates a selected delay value of the plurality of selected delay values, the selected delay value being associated with matching the predetermined criterion.

7. The integrated circuit of claim 1, wherein the signal to be delayed has a frequency greater than about 100 MHZ.

8. A built-in self-test (BIST) circuit comprising:
   a sampler register comprising a signal input configured to receive a signal to be delayed, a plurality of test result outputs, and a plurality of delay inputs that are each configured to be coupled to a respective delay output of a plurality of delay phases of an analog delay circuit, the sampler register being configured to
      output a sample signal indicating a relationship between the signal to be delayed and at least a final delay phase of the plurality of delay phases;
   a finite state machine circuit comprising a delay configuration output configured to be coupled to a delay configuration input of the analog delay circuit, and a plurality of test result inputs coupled to the plurality of test result outputs of the sampler register, the finite state machine circuit being configured to
      iterate through a plurality of selected delay values provided to the analog delay circuit at the delay configuration input to test the analog delay circuit,
      determine that the analog delay circuit passes the test by determining that the relationship matches a predetermined criterion in response to receiving the sample signal at the plurality of test result inputs, and
      output delay tuning data indicating a selected delay value of the plurality of selected delay values, the selected delay value being associated with matching the predetermined criterion;
   a test data register coupled to the finite state machine circuit, the test data register being configured to store status flags of the finite state machine circuit and the delay tuning data.

9. The BIST circuit of claim 8, wherein the finite state machine circuit is further configured to
   maintain an idle state while a BIST start flag is disabled, and
   begin testing the analog delay circuit in response to receiving a start signal enabling the BIST start flag.

10. The BIST circuit of claim 9, wherein the BIST circuit is configured to periodically test the analog delay circuit in the field to confirm that the analog delay circuit continues to pass the test.

11. The BIST circuit of claim 8, wherein the status flags comprise a pass/fail flag indicating whether the analog delay circuit has passed the test, a BIST run flag indicating whether the test is running, and a BIST end flag indicating if the test has ended.

12. The BIST circuit of claim 8, wherein the sample signal is a sequence of bits corresponding to delay outputs of the plurality of delay phases sampled at a predetermined instant relative to the signal to be delayed, and wherein the predetermined criterion is a signature sequence of bits indicating that a delay threshold has been met.

13. The BIST circuit of claim 12, wherein the signature sequence of bits is programmable.

14. The BIST circuit of claim 13, wherein the plurality of delay phases comprises at least one intermediate delay phase, and wherein at least one of the sequence of bits corresponding to the at least one intermediate delay phase is masked and not considered when determining that the relationship matches the predetermined criterion.

15. A method of testing an analog delay circuit of an integrated circuit, the method comprising:
    receiving a signal to be delayed at a signal input of the analog delay circuit, the analog delay circuit comprising a delay configuration input and a plurality of delay phases comprising an initial delay phase and a final delay phase;
    receiving the signal to be delayed at a signal input of a sampler register of the integrated circuit, the sampler register comprising a plurality of test result outputs and a plurality of delay inputs that are each coupled to a respective output of the plurality of delay phases;
    outputting from the sampler register a sample signal indicating a relationship between the signal to be delayed and at least the final delay phase of the plurality of delay phases;
    iterating through a plurality of selected delay values provided by a delay configuration output of a test circuit of the integrated circuit to the analog delay circuit at the delay configuration input to test the analog delay circuit, the test circuit comprising a plurality of test result inputs coupled to the plurality of test result outputs of the sampler register; and
    determining that the analog delay circuit passes the test in response to receiving the sample signal at the plurality of test result inputs by determining that the relationship matches a predetermined criterion.

16. The method of claim 15, wherein outputting the sample signal comprises outputting a sequence of bits corresponding to delay outputs of the plurality of delay phases sampled at a predetermined instant relative to the signal to be delayed, the predetermined criterion being a signature sequence of bits indicating that a delay threshold has been met.

17. The method of claim 16, wherein the plurality of delay phases comprises at least one intermediate delay phase, and wherein at least one of the sequence of bits corresponding to the at least one intermediate delay phase is masked and not considered when determining that the relationship matches the predetermined criterion.

18. The method of claim 16, wherein the signature sequence of bits is programmable.

19. The method of claim 15, further comprising:
    maintain an idle state of the test circuit while a start flag is disabled; and
    beginning iterating through the plurality of selected delay values to test the analog delay circuit in response to receiving a start signal enabling the start flag.

20. The method of claim 19, further comprising:
    periodically testing the analog delay circuit in the field using the test circuit to confirm that the analog delay circuit continues to pass the test.

\* \* \* \* \*